US012012232B2

(12) United States Patent
Demonty et al.

(10) Patent No.: US 12,012,232 B2
(45) Date of Patent: Jun. 18, 2024

(54) MODULAR AND CONFIGURABLE ATTITUDE CONTROL SYSTEM FOR A SPACECRAFT

(71) Applicant: Veoware SPRL, Ixelles (BE)

(72) Inventors: Julien Demonty, Welkenraedt (BE); Julien Tallineau, Evere (BE)

(73) Assignee: Veoware SPRL, Ixelles (BE)

( * ) Notice: Subject to any disclaimer, the term of this patent is extended or adjusted under 35 U.S.C. 154(b) by 159 days.

(21) Appl. No.: 17/435,305

(22) PCT Filed: Mar. 5, 2020

(86) PCT No.: PCT/EP2020/055899
§ 371 (c)(1),
(2) Date: Aug. 31, 2021

(87) PCT Pub. No.: WO2020/182623
PCT Pub. Date: Sep. 17, 2020

(65) Prior Publication Data
US 2022/0153454 A1    May 19, 2022

(30) Foreign Application Priority Data

Mar. 8, 2019  (EP) .................................... 19161663

(51) Int. Cl.
  *B64G 1/28*   (2006.01)
  *B64G 1/24*   (2006.01)
(52) U.S. Cl.
  CPC ............. *B64G 1/286* (2013.01); *B64G 1/244* (2019.05); *B64G 1/283* (2013.01)
(58) Field of Classification Search
  CPC ........... B64G 1/286; B64G 1/28; B64G 1/283
  See application file for complete search history.

(56) References Cited

U.S. PATENT DOCUMENTS 8,876,060 B2 * 11/2014 Nagabhushan ......... F16F 15/30
                                                    244/164
10,202,208 B1 * 2/2019 Sanyal .................... B64G 1/286
(Continued)

FOREIGN PATENT DOCUMENTS

CN      1641982 A  *  7/2005
EP      2263937 A1 * 12/2010  ............. B64G 1/286
(Continued)

OTHER PUBLICATIONS

Niklas Baker. "Feasibility and design of miniaturized Control Moment Gyroscope for a 3-axis stabilized Micro Satellite," Master Thesis, Lulea University of Technology, Dept. of Computer Science, Electrical and Space Engineering, Oct. 2016 (Oct. 2016), XP055619314, Retrieved from the Internet: URL:https://www.diva-portal.org/smash/get/diva2:1053012/FULLTEXT01.pdf (88 pages).

(Continued)

*Primary Examiner* — Philip J Bonzell
*Assistant Examiner* — Anna L. Gordon
(74) *Attorney, Agent, or Firm* — Fitch, Even, Tabin & Flannery LLP

(57) ABSTRACT

A spacecraft attitude control module (1) according to the invention is compact and easy to assemble with additional modules to form an operative attitude control system. The module comprises a robust rectangular, preferably cubic support frame with an attitude control assembly fitted within the confines of the support frame, the assembly including a reference structure comprising a platform, a flywheel support structure (15, 18, 19, 26) and a flywheel (25). The flywheel support structure may be fixed to the platform (10) or it may be a gimbal structure that is rotatable relative to the platform. In the first case the module is a reaction wheel module. In the second case the module is a single gimbal control moment gyroscope module. A preferred embodiment includes a slanted position of the platform (10) relative to the ground plane (100) of the support frame. Another preferred characteristic is the implementation of a flywheel provided with a hollow portion (25') into which the motor (28) that is driving the flywheel rotation is fitted. The invention is also related to an attitude control system comprising multiple modules assembled together on a support plate (35). The modules may be provided with decking plates (39, 39') to improve the mechanical robustness of the assembly and to realize fast electrical connections to the modules.

12 Claims, 7 Drawing Sheets

(56) References Cited

U.S. PATENT DOCUMENTS

| | | | |
|---|---|---|---|
| 10,518,910 B1* | 12/2019 | Romano | G01C 19/04 |
| 2010/0006705 A1 | 1/2010 | Faucheux et al. | |
| 2011/0011982 A1* | 1/2011 | Herman | B64G 1/286 |
| | | | 244/165 |
| 2019/0023424 A1* | 1/2019 | Helvajian | B64G 1/283 |

FOREIGN PATENT DOCUMENTS

| | | | |
|---|---|---|---|
| EP | 2263937 A1 | | 12/2010 |
| JP | 2017017807 A | * | 1/2017 |
| JP | 2017017807 A | | 1/2017 |
| WO | 2010135421 A2 | | 11/2010 |

OTHER PUBLICATIONS

International Search Report and Written Opinion dated May 15, 2020 for International Application No. PCT/EP2020/055899 (16 pages).

\* cited by examiner

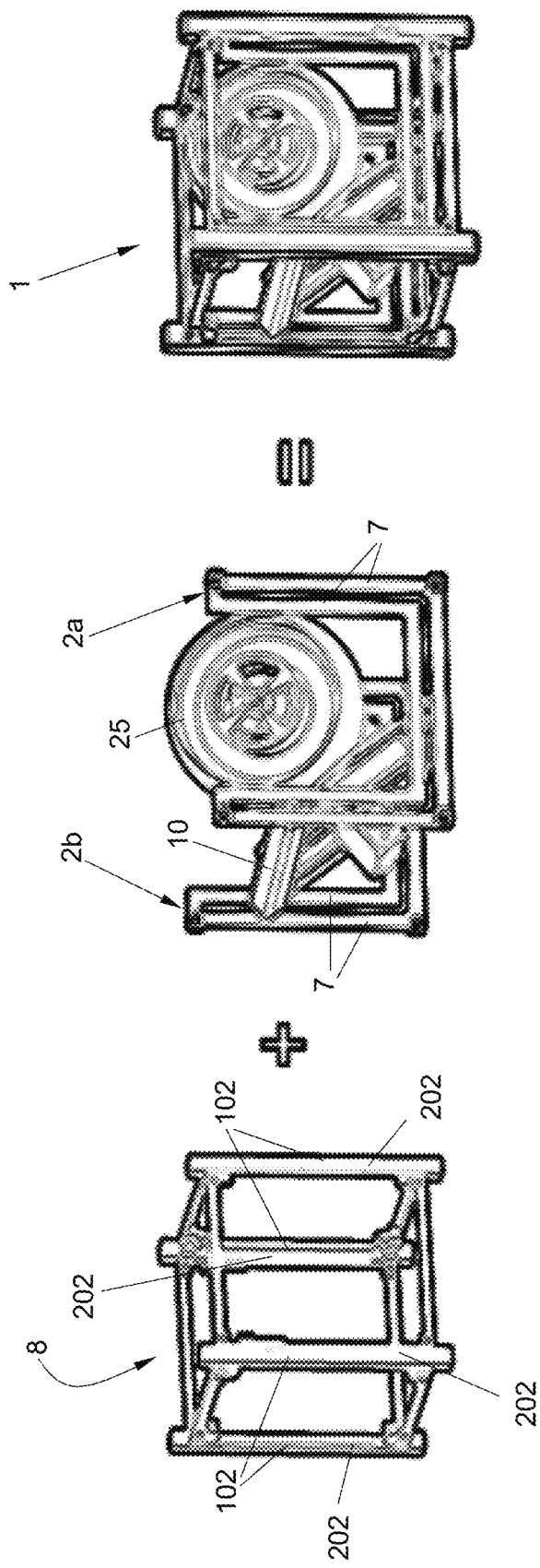

MODULAR AND CONFIGURABLE ATTITUDE CONTROL SYSTEM FOR A SPACECRAFT

FIELD OF THE INVENTION

The present invention is related to attitude control systems spacecrafts, in particular for satellites. These systems control the craft's orientation relative to its own centre of gravity, in order to maintain a given position with respect to the earth and/or to a predefined orbit.

STATE OF THE ART

Known attitude control systems include magneto torquers, reaction wheels and control moment gyroscopes (CMGs). CMGs have attracted particular interest because of their high output torque. Nevertheless, cost-effective CMG-based systems are not available for the full range of satellites in terms of the satellite dimensions and weight. Small CMG's have been developed for the attitude control of nano and micro satellites in the range of 5 to 100 kg, such as the Microsat CMG Attitude Control Array by Honeybee Robotics. For large satellites of 500 kg and more, dedicated CMG systems have been developed which are however not scalable to smaller sizes. In the range of satellites between 10 and 500 kg, specific solutions have been proposed, like the system described in "Feasibility and design of miniaturized Control Moment Gyroscope for a 3-axis stabilized Micro Satellite", N. Baker, Masters Thesis, 2016, Luleå University of Technology (Sweden). This study proposes an assembly of four single gimbal CMG (SGCMG) units in a rectangular frame. The design is however technically complex and lacks mechanical robustness. Moreover, this system is not suitable for satellites of more than about 50 kg, and the system is not scalable to more important weights.

A modular CMG system for spacecrafts is described in US2011/011982. The system comprises multiple cube-shaped identical modules, which are mounted in a spacecraft array bus structure. No specific details are provided on the CMG assembly inside each of the modules. This assembly inside each module is not adjustable in terms of its orientation and functionality.

SUMMARY OF THE INVENTION

The invention aims to provide an attitude control system that does not suffer from the disadvantages set out above. This aim is achieved by a module and assemblies of such modules, as described in the appended claims. An attitude control module according to the invention is compact and easy to assemble with additional modules to form an operative attitude control system. The module comprises a robust rectangular, preferably cubic support frame with an attitude control assembly fitted within the confines of the support frame, the assembly including a reference structure, a flywheel support structure and a flywheel. The reference structure comprises a platform, preferably a platform that bridges the width of the support frame. The flywheel support structure is oriented along a first axis that is essentially perpendicular to the platform. The flywheel is rotatable relative to the flywheel support structure, about a second axis that is essentially perpendicular to the first axis. A preferred embodiment includes a slanted position of the platform relative to the ground plane of the support frame. Another preferred characteristic is the implementation of a flywheel provided with a hollow portion into which the motor that is driving the flywheel rotation is fitted. The flywheel support structure may be immovably fixed to the platform, in which case the module acts as a reaction wheel. Alternatively, the flywheel support structure may be a gimbal structure that is rotatable relative to the platform. The rotation of the gimbal structure is actuated by a gimbal motor that is part of the reference structure. In the latter case, the module is a single gimbal control moment gyroscope (SGCMG). The invention is also related to an attitude control system comprising multiple modules assembled together on a support plate. The modules may be provided with decking plates to improve the mechanical robustness of the assembly and of the spacecraft and to realize fast electrical connections to the modules.

The invention thus provides a modular solution to the problem of designing attitude control systems for satellites, that furthermore allows to combine SGCMG modules and reaction wheel modules in a single attitude control system. The modules have standard dimensions and can thus be assembled in a straightforward way, to meet the requirements of a particular satellite. Advantageously, it is straightforward to produce an assembly of more than 4 modules. Specifically in the satellite weight range of 50-500 kg, the invention provides a solution to the drawbacks of existing systems.

The invention is in particular related to a spacecraft attitude control module comprising:
- a 3-dimensional rectangular support frame defined by level rib portions arranged in a ground plane and in an upper plane, and upstanding rib portions interconnecting the level rib portions of the ground plane to the rib portions of the upper plane,
- an attitude control assembly fitted within the confines of the support frame, and comprising:
  - a reference structure comprising a platform that is fixed to the support frame,
  - a flywheel and a flywheel support structure, wherein the flywheel support structure is oriented along a first axis that is perpendicular with respect to the platform,
  - a flywheel motor for actuating the rotation of the flywheel relative to the flywheel support structure about a second axis that is essentially perpendicular to the first axis.

According to an embodiment, the platform is arranged at a slanted angle relative to the ground plane of the support frame.

The platform may be a rectangular platform attached to a pair of mutually parallel profiles, the ends of each profile being fixed respectively to a level rib portion arranged in the ground plane and to an upstanding rib portion of the support frame, so that the profiles and the platform are in a slanted position relative to the ground plane of the support frame.

According to an embodiment, the angular position of the platform relative to the ground plane of the support frame is adjustable to one of a plurality of fixed angular positions.

The flywheel may comprise a hollow central portion, wherein the flywheel motor is mounted inside the hollow central portion. In the latter case, the flywheel support structure may comprise at least a first upstanding bracket, wherein the flywheel motor is attached to said bracket through a carrier frame comprising a planar portion that is fixed to a lateral surface of the upstanding bracket, and a tubular portion extending outward from the planar portion, wherein the flywheel motor is mounted inside the tubular portion and is attached to the distal end thereof, and wherein the tubular portion is inserted in the hollow central portion of the flywheel, the flywheel motor having a rotatable axle protruding through the distal end of the tubular portion and being coupled to the flywheel. In any embodiment of a module according to the invention, the flywheel's outer surface is preferably spherically shaped. More preferably, the flywheel comprises a shell portion having a spherical outer surface and a cylindrical inner surface. According to an embodiment, the rectangular support frame is a cubic frame of about 10×10×10 cm.

According to an embodiment, the flywheel support structure is fixed to the platform, so that the module operates as a reaction wheel.

According to an embodiment, the flywheel support structure is a gimbal structure that is rotatable with respect to the platform about the first axis, so that the module operates as a single gimbal control moment gyroscope (SGCMG), and wherein the reference structure comprises a gimbal motor configured to actuate the rotation of the gimbal structure relative to the platform. According to a preferred embodiment, the gimbal motor is a piezo-motor. An electronic driver unit for driving the piezo-motor may be integrated in the module.

In an SGCMG module according to the invention, the platform may comprise a cavity in the back of the platform, wherein the gimbal motor is fitted partially into the cavity, the gimbal motor comprising a rotatable axle protruding through the platform at the front thereof, and wherein the gimbal structure is coupled to the motor axle.

According to an embodiment of a SGCMG module of the invention, the gimbal structure comprises:
A first gimbal portion rotatably coupled to the gimbal motor,
An encoder disc,
A planar second gimbal portion attached to the first gimbal portion with the encoder disc interposed between the first and second portion,
At least a first upstanding bracket, with the flywheel motor being attached to said upstanding bracket,
wherein the reference structure comprises a sensor configured to detect the position of the encoder disc.

The gimbal structure may further comprise a second upstanding bracket on the opposite side of the first bracket, so that the flywheel is supported on two sides by the first and second brackets. According to an embodiment of a SGCMG module of the invention, the module comprises an electric cable for supplying power to the flywheel motor, the flywheel motor being an electric motor, and wherein the cable is arranged in a spiral winding placed in a confined space between the encoder disc and the second gimbal portion, and wherein the winding is free to be wound on or off over a given winding range.

The invention is also related to an attitude control system comprising multiple attitude control modules according to the invention, arranged on a support plate and mechanically attached to said support plate and to each other, and wherein the modules are preferably arranged in a rectangular array.

Each module of an attitude control system of the invention may be provided with a decking plate mechanically attached to the upper plane of the module, wherein adjacent decking plates are mechanically attached to each other.

The decking plates may be provided with first electrical connectors, wherein the modules are provided with second electrical connectors configured to engage with the first connectors for establishing an electrical connection, and wherein the connectors on the decking plates and on the modules are positioned in such a manner that the electrical connection is established when the decking plates are mechanically attached to the upper plane of the modules.

According to an embodiment, at least one decking plate of the system comprises control and power electronics for powering and controlling a plurality of modules of the system, and wherein the control and power plate is electrically connected to the plurality of decking plates provided on the plurality of modules.

BRIEF DESCRIPTION OF THE FIGURES

FIG. 3 illustrates an alternative form of the support frame in an SGCMG module according to the invention.

DETAILED DESCRIPTION OF THE INVENTION

Figure 1A:
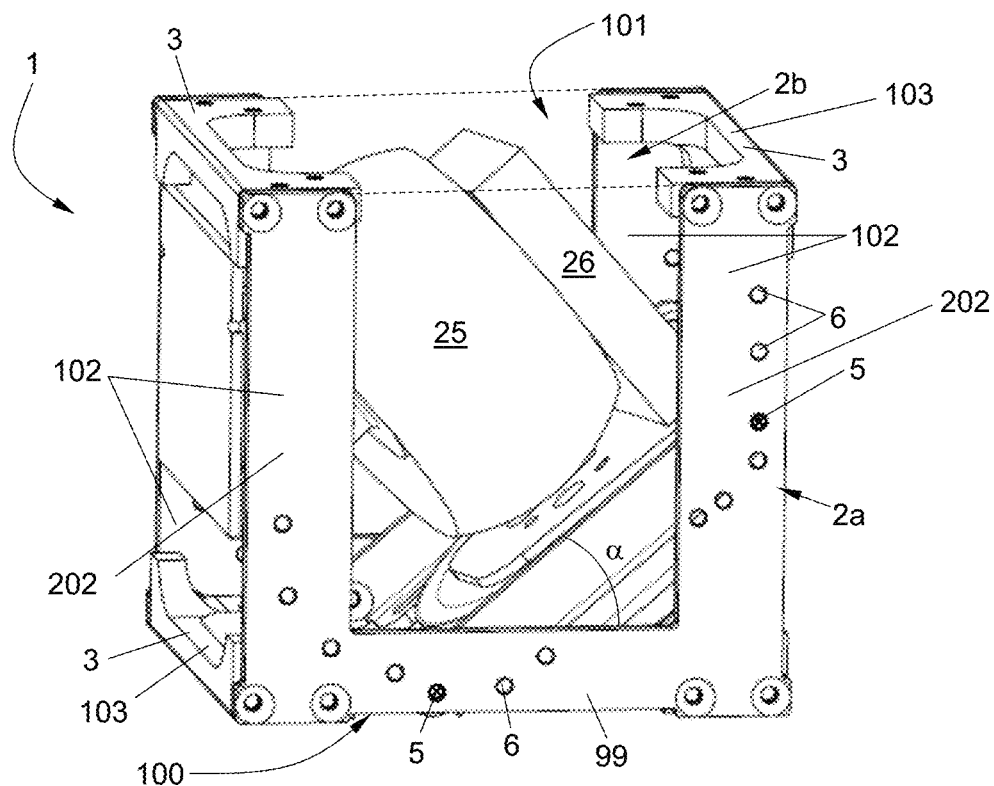
FIGS. 1a and 1b show two 3-dimensional images of a SGCMG module according to a preferred embodiment of the invention.
Figure 1B:
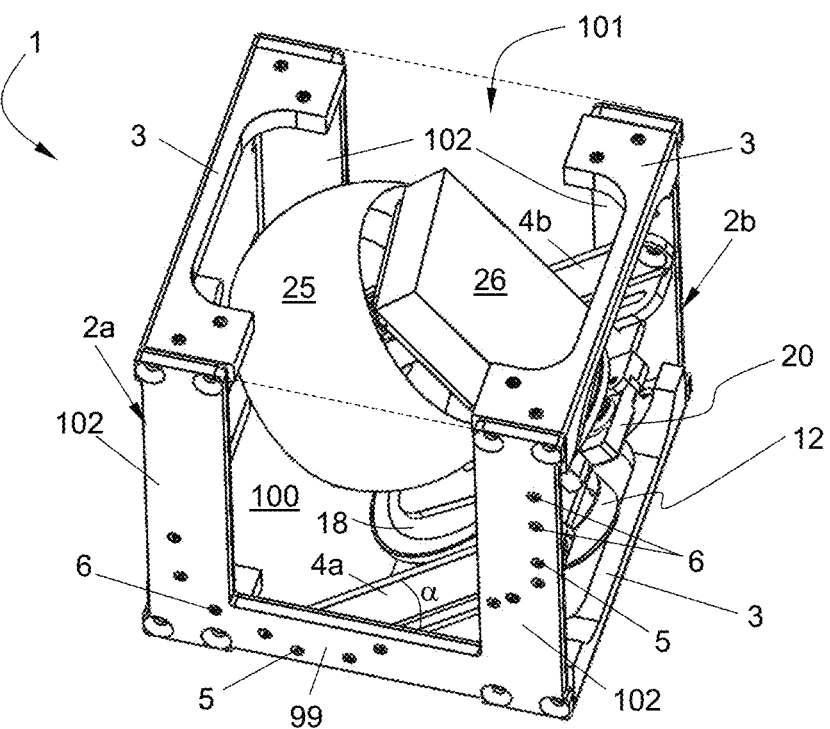

A detailed description is first given of a single gimbal control moment gyroscope (SGCMG) module according to an embodiment the invention. As seen in FIGS. 1a/1b and 2a/2b, the SGCMG module 1 according to a preferred embodiment of the invention is shaped as a cube of given dimensions, preferably about 10×10×10 cm. The SGCMG module comprises a support frame that defines the boundaries of the cube, and a SGCMG assembly confined within said boundaries. In the embodiment shown in the drawings, the support frame comprises two U-shaped plate elements 2a and 2b arranged parallel to each other and with the open side of the 'U' directed upwards. Each U-shaped element has a horizontal leg 99 and two upstanding vertical legs 102. The U-shaped elements are spaced apart by four brackets 3, to thereby define the outer limits of the cube. Using the wording of the appended claims and with reference to FIGS. 1a and 1b, the support frame comprises a ground plane 100, an upper plane 101, and upstanding rib portions 202, formed by the upstanding legs 102 of the U-shaped elements, which interconnect level rib portions 103 in the ground plane and upper plane. Instead of using the U-shaped elements 2a and 2b and the brackets 3, the support frame could be formed by other constituent parts which fulfil the above-cited claim language. The upstanding legs of the U-shaped elements could be connected together by additional brackets. The support frame is formed of a mechanically stiff material, preferably a lightweight material, such as aluminium.

Two mutually parallel L-profiles 4a and 4b are connected respectively to the U-shaped elements 2a and 2b, in such a manner that the ends of each profile are fixed respectively to an upright leg 102 of a U-shaped element and to the horizontal leg 99 of said element. The profiles 4a and 4b are thus in a slanted position relative to the ground plane 100 of the cube, as defined by the angle α indicated in FIGS. 1a and 1b. The profiles 4a and 4b are preferably fixed to the U-shaped elements 2a and 2b by screw connections 5. As in the preferred embodiment shown in the drawings, the U-shaped elements 2a and 2b are preferably provided with multiple holes 6, allowing a choice between multiple angular positions of the profiles 4a and 4b relative to the U-shaped elements 2a and 2b.

Figure 2A:
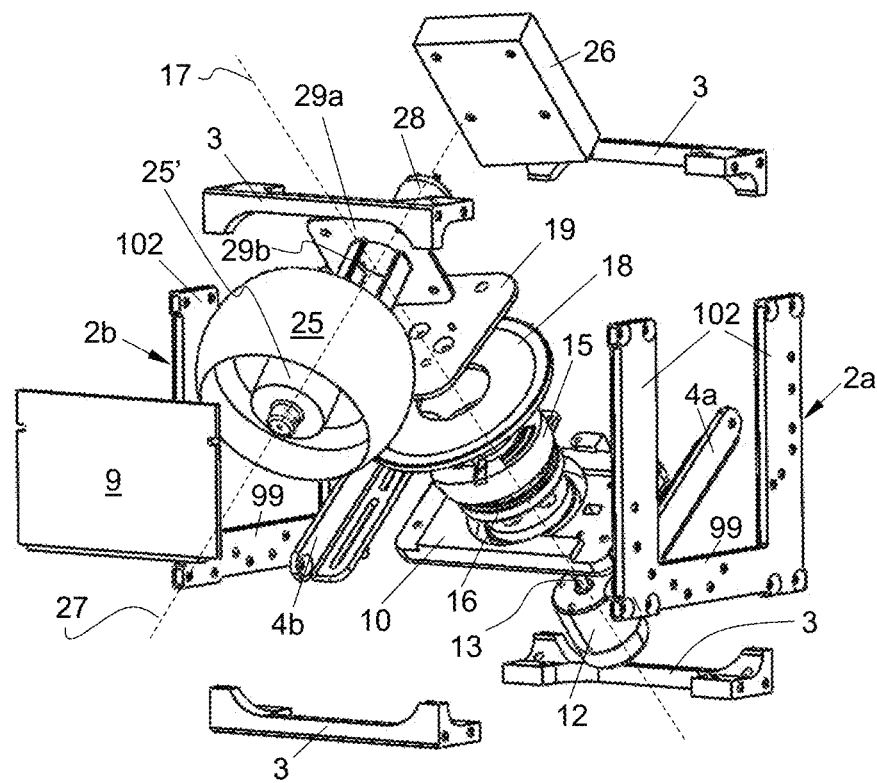
FIGS. 2a and 2b show two exploded views of the SGCMG module of FIGS. 1a and 1b.
Figure 2B:
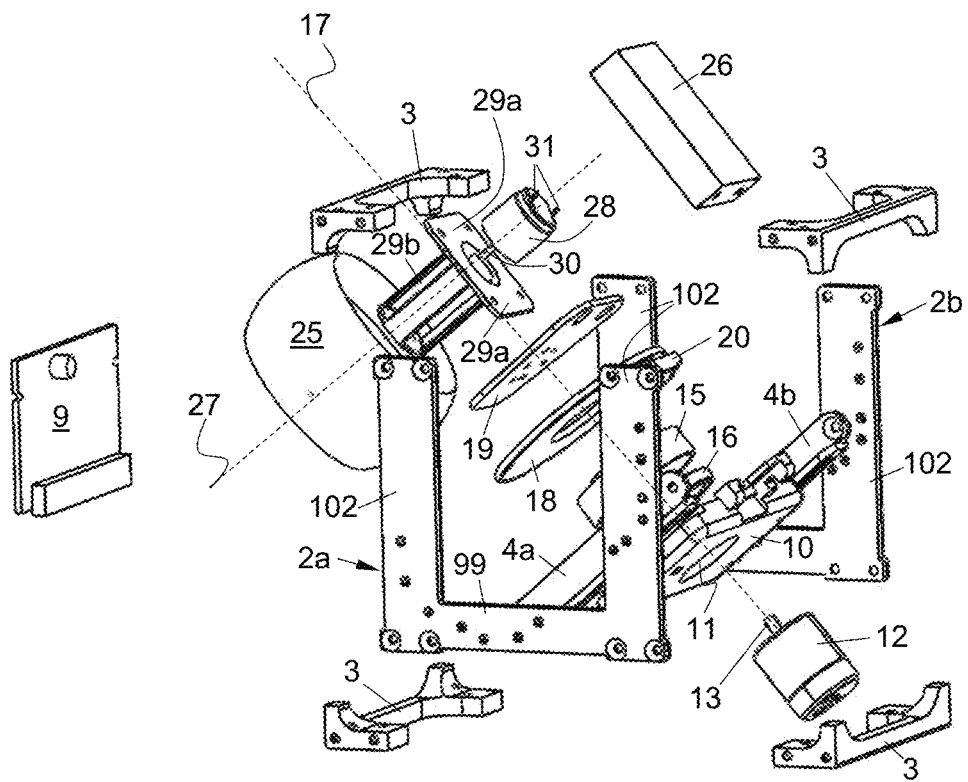

With reference to FIGS. 2a and 2b, a rectangular platform 10 is attached to the L-shaped profiles 4a and 4b, bridging the space between said profiles, preferably by bolting the platform to the horizontal leg of the of the symmetrically arranged profiles. The platform 10 is thus equally in a slanted position relative to the ground plane 100, defined by the slant angle α of the profiles 4a and 4b. In an alternative embodiment, the platform 10 may be attached directly to the U-shaped profiles 2a and 2b or equivalent rib portions of the support frame, without the interposition of the profiles 4a and 4b.

Figure 2C:
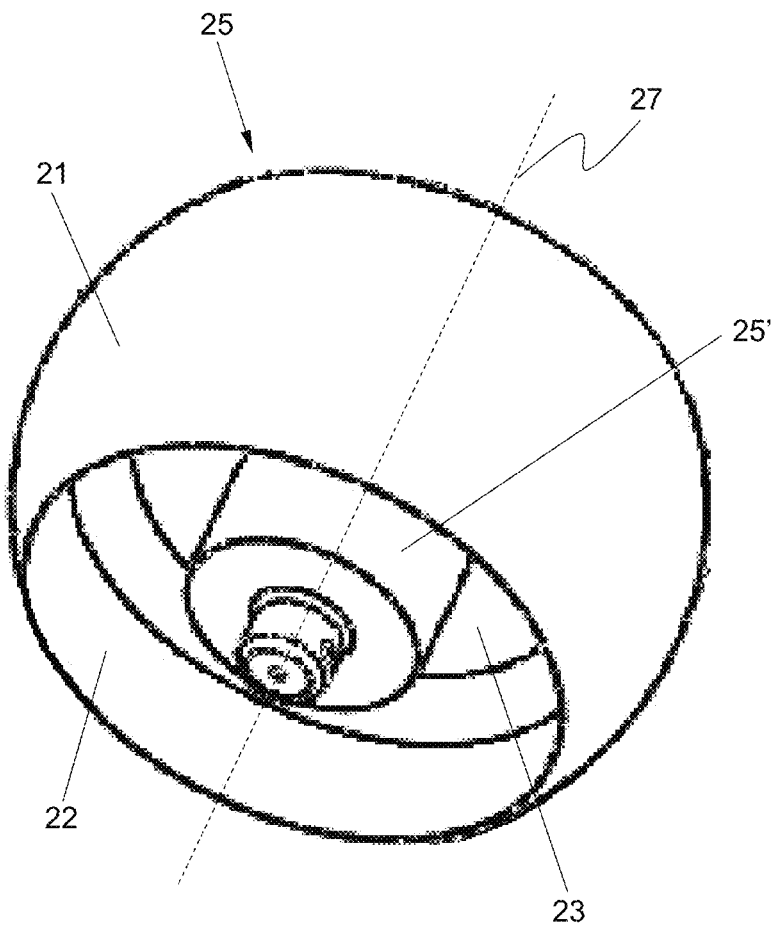
FIG. 2c shows a detail view of the flywheel according to a preferred embodiment.

When the profiles are included, these profiles could have a different shape besides the L-profiles shown in FIGS. 1 and 2. The profiles are preferably provided with multiple holes so that the platform may be attached by bolt connections to these profiles, at a plurality of positions along the length of the profiles. This allows to adapt the position of the platform relative to the profiles as a function of the angle α, so that the SGCMG assembly is optimally positioned within the confines of the support frame, for each of the available inclination angles α.

The platform 10 is part of the reference structure of the SGCMG assembly, and comprises a cavity 11 in its back surface, into which an electric motor 12 is partially inserted, the motor 12 being also part of the module's reference structure. In the preferred embodiment of the module according to the invention, the motor 12 is a piezo motor, which results in a very compact assembly, as a piezo-motor is capable of delivering high torque without the need for a gearbox. Other solutions such as a stepper motor/gearbox combination are not excluded from the scope of the invention but the present detailed description is based on the application of a piezo motor 12 for driving the rotation about the gimbal axis 17.

The piezo-motor 12 is powered and controlled via a piezo driver unit 9 incorporated in the module. The body of the motor 12 is bolted to the bottom of the cavity 11, while the rotatable axle 13 of the motor protrudes through a hole in said bottom of the cavity. The slanted position of the platform 10 facilitates the positioning of the motor 12 within the boundaries of the cubic support frame, thereby enabling a very compact design of the SGCMG module. The slanted position furthermore increases the number of degrees of freedom available when an assembly of modules according to the invention is driving the orientation of a satellite. The scope of the invention however equally includes embodiments wherein the platform 10 is parallel to the ground plane 100 of the support frame (i.e. the gimbal axis is then perpendicular to said ground plane).

The rotatable axle 13 of the motor is coupled to a first gimbal portion 15 that is thereby rotatable relative to the platform 10. The rotatable coupling is realized by a bearing 16 fitted into the front side of the platform 10. The first gimbal portion 15 is rotatable about a first axis 17 that is perpendicular to the platform 10. The axis 17 is the gimbal axis referred to above. An encoder disc 18 is fixed, preferably glued, to the first gimbal portion 15 so that the disc 18 rotates together with the first gimbal portion 15. The disc 18 is furthermore pressed between the first gimbal portion 15 and a second, plate-shaped gimbal portion 19 that is fixedly attached, preferably by screw connections, to the first gimbal portion 15. The second gimbal portion 19 comprises, fixed to its upper surface, an upstanding support bracket 26. The second gimbal portion 19 is furthermore provided with openings for the passage of electric wires (not shown) coupled to the flywheel motor (see further). The first and second gimbal portions 15 and 19, the disc 18 and the bracket 26 together form a gimbal structure that is rotatable about the gimbal axis 17. A sensor 20 is mounted on the platform 10, and arranged to sense the position of the encoder disc 18. A disc and sensor combination known as such may be used in the SGCMG module according to the invention. The Atom™ encoder system from Renishaw plc is a suitable choice.

A flywheel 25 is rotatably mounted on the upstanding support bracket 26. The flywheel 25 is rotatable about a second axis 27 that is essentially perpendicular relative to the first axis 17. According to the preferred embodiment shown in the drawings, the flywheel 25 comprises a hollow central portion 25'. Preferably, and as illustrated in the detail in FIG. 2c, the flywheel 25 comprises a shell portion having a spherical outer surface 21 and a cylindrical inner surface 22. The hollow central portion 25' is attached to the shell by a central wall portion 23. This structure allows to concentrate the majority of the mass of the flywheel at its radial extremity relative to the rotation axis 27, which maximizes the efficiency of the module's operation. At the same time, the spherical outer surface 21 enables a higher angular range, compared to a flywheel with a cylindrical outer surface, of the flywheel's rotation around the gimbal axis 17, while the flywheel remains within the confines of the cubic support frame.

An electric motor 28 is mounted in a carrier frame 29 that comprises a plate 29a provided with a central hole, and a tube-shaped protrusion 29b extending outward from the plate 29a, and being coaxial with the central hole. The motor 28 is mounted inside the tube-shaped protrusion 29b and is fixedly attached to the distal end thereof, with the axle 30 of the motor 28 protruding through said distal end. The tube-shaped protrusion 29b has openings in its tubular wall for allowing the passage of electric wires (not shown) to the flywheel motor 28. The tube-shaped protrusion 29b fits into the hollow portion 25' of the flywheel 25, and the axle 30 is coupled to the flywheel 25 itself. The rotation axis of the motor's axle 30 is aligned to the central axis of the flywheel 25 so that the motor actuates the flywheel's rotation about the common rotation axis 27. The plate 29a is fixed to a lateral surface of the bracket 26. In an alternative embodiment illustrated in FIG. 9 and described in more detail later in this description, a second upstanding bracket 50 is mounted on the second gimbal portion 19, and the flywheel is mounted in between the two brackets. In the latter case, the flywheel is supported by and rotatable with respect to the second bracket 50, so that the flywheel is supported in two locations. In this case, the arrangement of the motor 28 inside the flywheel 25 can be identical to the previous embodiment.

The feature of mounting the motor 28 in a hollow portion of the flywheel 25 is particularly advantageous in that it results in a very compact design, that furthermore facilitates the alignment of the center of mass of the flywheel+motor assembly 25+28 with the gimbal axis 17. When the motor is placed outside the flywheel, the placing of additional weights is required in order to obtain this alignment. This is not needed in the design according to the embodiment shown in the drawings, as the motor is placed inside the flywheel.

The electric motor 28 is powered via electric wires (not shown), connected to the terminals 31 of the motor and led through the openings in the wall of the tubular portion 29b of the carrier frame and further through openings in the second gimbal portion 19. The wires are preferably arranged as a paired cable arranged in a spiral winding mounted in a confined space between the disc 18 and the front surface of the platform 10. Within the confined space, the cable is free to be wound on or off over a given winding range. The spiral thereby allows the rotation of the gimbal structure over a given angular range, whilst ensuring the supply of power to the motor 28. The spiral winding increases the lifetime of the module compared to a sliring-based connection of the motor, used for example in the CMG system designed by N. Baker, referred to above.

The SGCMG assembly in a module 1 according to the embodiment shown in the drawings operates in a manner known as such in the art. Based on the encoder signal generated by the sensor 20, a control algorithm implemented in the piezo driver 9 generates command signals for the piezo-motor 12 for controlling the angular motion of the gimbal structure about the gimbal axis 17 within a given angular range, while the flywheel 25 rotates at a constant rotational speed. The motion of the gimbal structure generates a torque that acts to change the orientation of the SGCMG module 1 and of a satellite to which it is attached.

The invention is also related to a reaction wheel module having the same dimensions and comprising the same support frame as a SGCMG module according to the invention. The reaction wheel module furthermore comprises also a reference structure comprising a platform, like the platform 10 shown in FIGS. 1 and 2, i.e. preferably a rectangular platform that bridges the width of the support frame. Extending in the direction perpendicular to the platform, the reaction wheel module comprises a flywheel support structure. This may be the upstanding bracket 26 attached to the plate-shaped element 19 shown in FIGS. 1 and 2, that is now immovably fixed to the platform 10, for example by bolting the plate 19 directly to the platform 10, i.e. eliminating the decoder disc 18, the bearing 16 and the gimbal part 15. Alternatively, these elements 15,16 and 18 could be maintained and the SGCMG module may be turned into a reaction wheel module, either by blocking the gimbal motor 12, or by replacing the gimbal motor by a clamp mechanism that obstructs any rotation of the gimbal structure. These are reversible changes to the module, and a module configured to allow such changes is in fact multifunctional module that can be turned into either a reaction wheel module or a CMG module.

An example of an alternative support frame for a reaction wheel module, a SGCMG module or a multifunctional module according to the invention is shown in FIG. 3. Two U-shaped elements 2a and 2b are again visible, this time executed as sets of spaced-apart rails 7. The platform 10 is attached to the U-shaped elements by screw connections arranged in the slit between the rails 7, thereby allowing a higher degree of flexibility of the adjustment of the angular position of the attitude control assembly. The U-shaped elements are fixed to the upstanding ribs 202 of a cube-shaped support frame 8, to form the module 1. The upstanding ribs 202 extend slightly outward from the ground plane and upper plane of the module, which is useful for assembling the modules to a support plate and to a decking plate, see further.

The rectangular, preferably cubic shape of the attitude control module 1 according to the invention enables a straightforward way of assembling several modules according to the invention to form a modular operative attitude control system. The invention is therefore also related to such a system. The system may comprise only CMG modules, only reaction wheel modules or any configuration of the two module types combined, i.e. the system is modular and configurable. The dimensions and components of the modules can be standardized so that a system may be built by assembling standard 'off the shelf' modules, which decreases the design cost of the attitude control system. By multiplying the number of modules, a degree of redundancy can be built into the system, while obtaining the same performance as a classic CMG. This increases the reliability of the system.

An advantageous feature that adds to the configurable aspect of the system is the adjustable orientation of the attitude control assemblies within the modules, e.g. by the adjustable position of the platform 10 relative to the support frame enabled by the plurality of holes in the support frame's rib portions (FIGS. 1 and 2) or by the slit between the rails 7 (FIG. 3). This feature allows to implement various orientations of the attitude control assemblies within a system comprising multiple modules while maintaining a fixed orientation of the modules themselves, preferably by placing the modules side by side on a support plate, arranged in a rectangular array. The adjustable orientation of the attitude control assemblies within the modules also allows to design a system with higher angular momentum capacity in a given direction than in other directions, which can be advantageous for particular satellite types.

Figure 4:
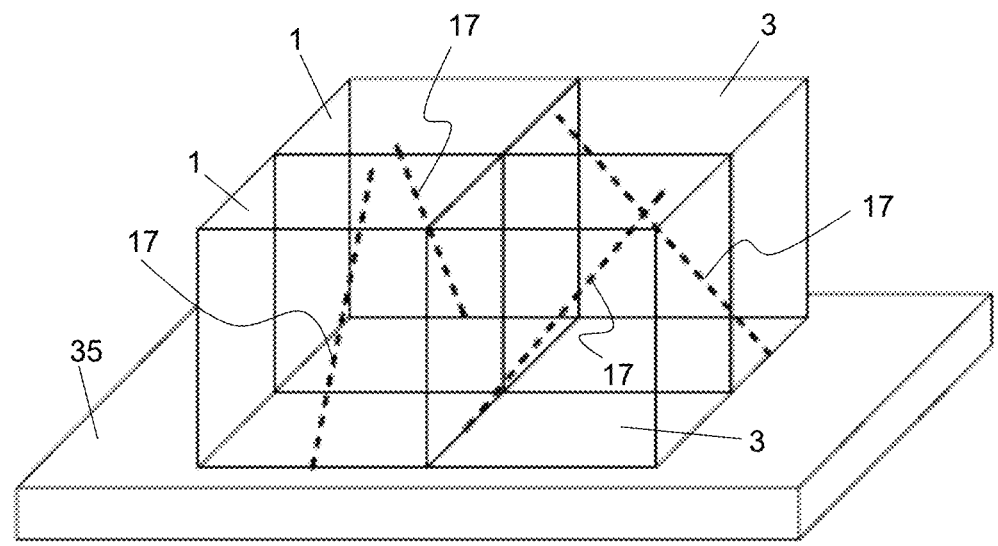
FIG. 4 illustrates one way of assembling four attitude control modules according to the invention.

An example of an attitude control system according to the invention is illustrated in FIG. 4, showing a cluster formed of four SGCMG modules arranged in a square configuration on a support plate 35. The gimbal axes 17 of the four modules are arranged according to four different orientations. This arrangement is equivalent to the pyramid configuration which is known as such, for controlling the rotation of a satellite about three orthogonal axes. Additional modules may be added to the configuration, in order to obtain additional positioning capability. The modules are preferably arranged as a 2-dimensional rectangular array on a support plate. The support frames of adjacent modules are attached to each other mechanically, for example by screw connections. As the support frames of the modules have a high degree of mechanical stiffness, the assembly of several modules results in a mechanically strong structure of the module assembly as such and of the spacecraft to which it is attached, so that both are capable of withstanding the important loads acting on the attitude control system during launching of the satellite. Possibly empty support frames can be added to the system in order to increase the stiffness further.

The attitude control module according to the invention thereby allows to build a mechanically robust attitude control system in a straightforward way by combining a number of standard modules, and to adapt the system to the requirements of a particular satellite, by selecting and arranging a required number of modules. By increasing the number of modules, the attitude control system can be adapted to the weight of the satellite, thereby providing a viable solution for satellites in the range of 50 to 500 kg.

The attitude control modules (reaction wheel or CMG) may furthermore be combined with other control modules, such as thruster modules. The thruster modules comprise a thruster housed within the confines of a support frame that is essentially identical to the support frame of the attitude control modules, so that the assembly of these modules with a plurality of attitude control modules is possible in the manner described above and illustrated in FIG. 4, and also hereafter in FIG. 7. In this way a complete Attitude and Orbit Control System (AOCS) can be built in a modular way.

Figure 5:
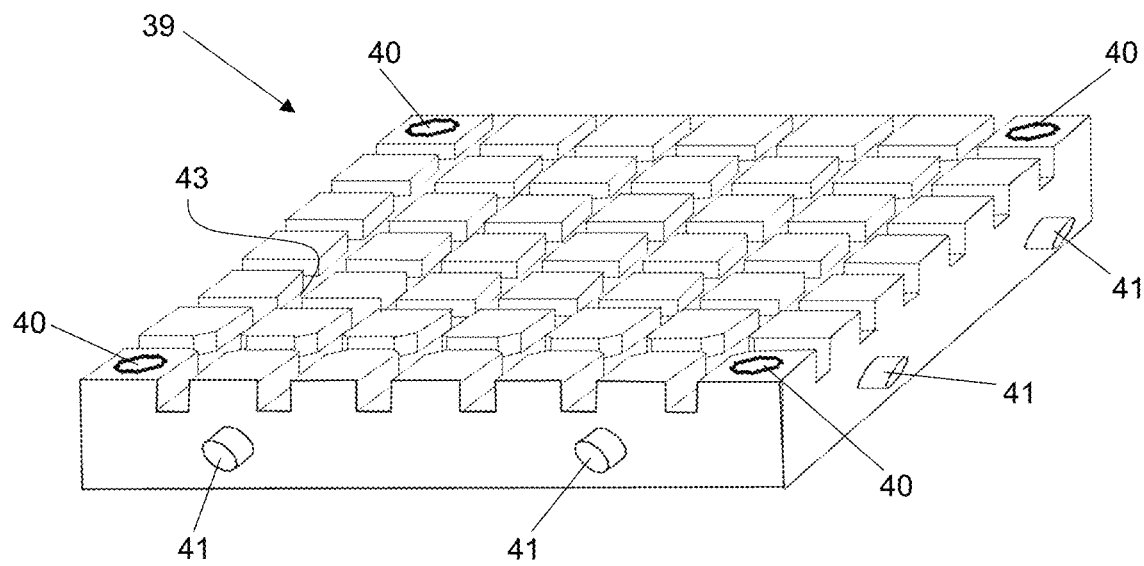
FIG. 5 shows an embodiment of a decking plate which can be fitted onto an attitude control module according to the invention.
Figure 6:
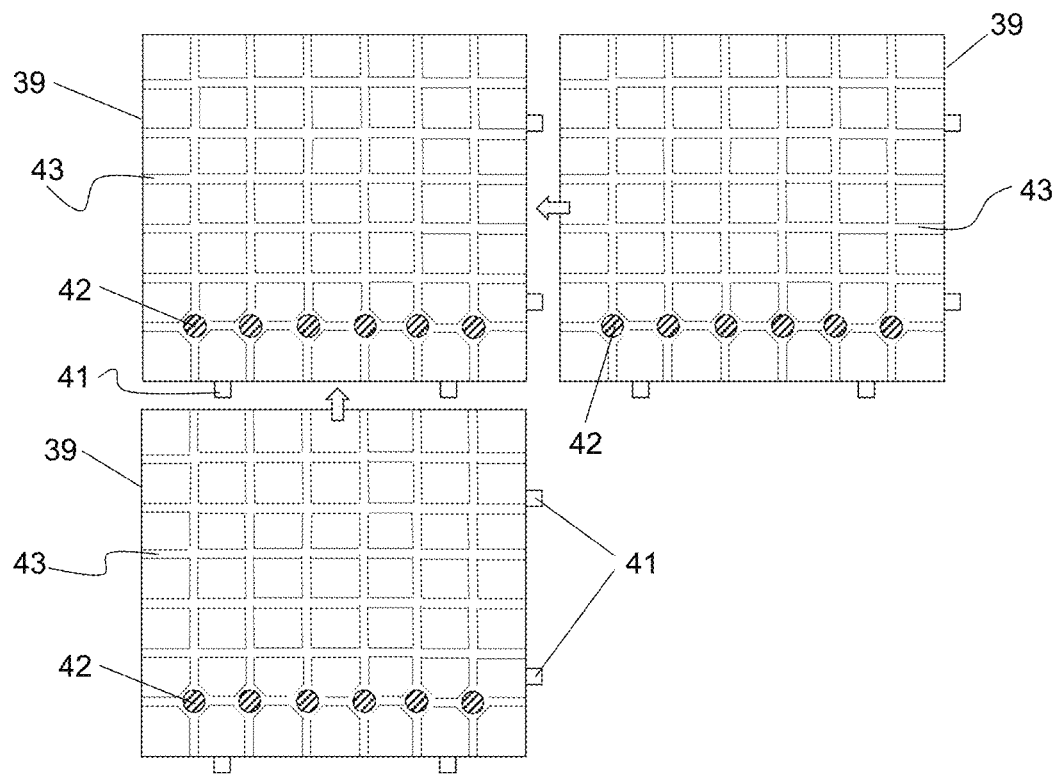
FIG. 6 illustrates how three decking plates can be assembled together.

According to an embodiment, additional mechanical stiffness of an assembly as shown in FIG. 4 is realized by providing a decking plate on top of each module and by attaching the decking plates together to form a rigid upper surface of the attitude control system or AOCS system. The surface dimensions of the decking plate correspond to the surface dimensions of the ground and upper planes of an attitude control module. An image of one embodiment of a single decking plate 39 is shown in FIG. 5. The material of the plate may be aluminium, which is advantageous due to its low weight. The decking plate 39 comprises mechanical slots 40 in its four corners for receiving protrusions arranged on the corners of the upper plane of a module 1. In the case of the embodiment of FIG. 3, these protrusions are the parts of the upstanding legs 102 extending beyond the upper plane. The decking plate 39 further comprises lateral connectors 41 for mechanically connecting the plate to an adjacent plate. The decking plate may also provide additional functionality, related to the power supply and signals transmission of the module. FIG. 6 illustrates the assembly of three decking plates 39 via lateral connectors 41 fitting into corresponding slots in the sides of the adjacent plates. The plates are furthermore provided with electrical connectors 42 configured to receive a matching connector for supplying power and control signals to and/or from the modules. The plates are preferably provided with a cross-pattern of grooves 43 into which electrical cables can be fitted.

Figure 7:
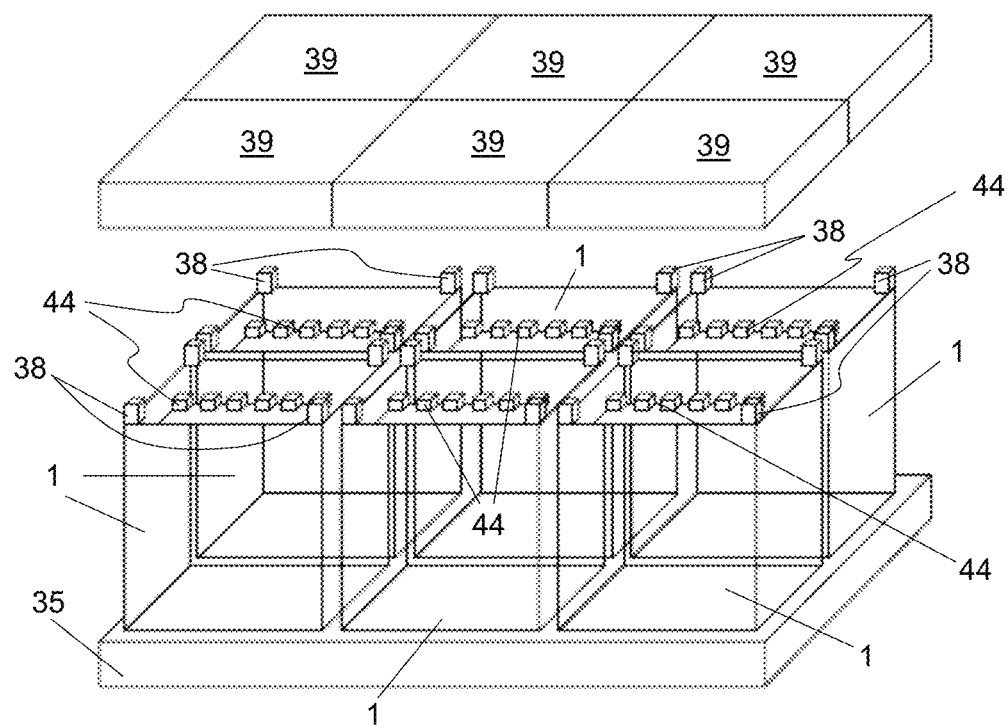
FIG. 7 illustrates an attitude control system comprising six modules and provided with an assembly of six decking plates.

FIG. 7 illustrates an assembly of six modules 1 mounted on a support plate 35 and about to be provided with an assembly of six corresponding decking plates 39, by placing the plate assembly on top of the assembly of modules. Protrusions 38 are provided on the corners of the modules, configured to enter the slots 40 on the decking plates 39, when the decking plate assembly is fitted on top of the module assembly. The modules are provided with electrical connectors 44 coupled to cables (not shown) connected to the electric motor or motors and to other electrical components within the modules. The connectors 44 are configured to engage with the connectors 42 of the decking plates and are located on the modules in positions which correspond to the location of the connectors 42 of the decking plates, so that the mounting of a decking plate onto a module automatically establishes the electrical connection of the connectors 44 to the connectors 42. Connectors 42 and 44 are respectively realized as sockets and plugs or vice versa. The decking plates 39 may be coupled to external control and power electronics, not shown in FIG. 7.

Multiple levels of attitude control assemblies can be built by mounting attitude control assemblies as described above on top of each other with an assembly of decking plates 39 interposed between two adjacent levels. The slots 40 are then formed on both sides of the decking plates 39, so that a module 1 can be mechanically attached on both sides of a decking plate 39.

Figure 8:
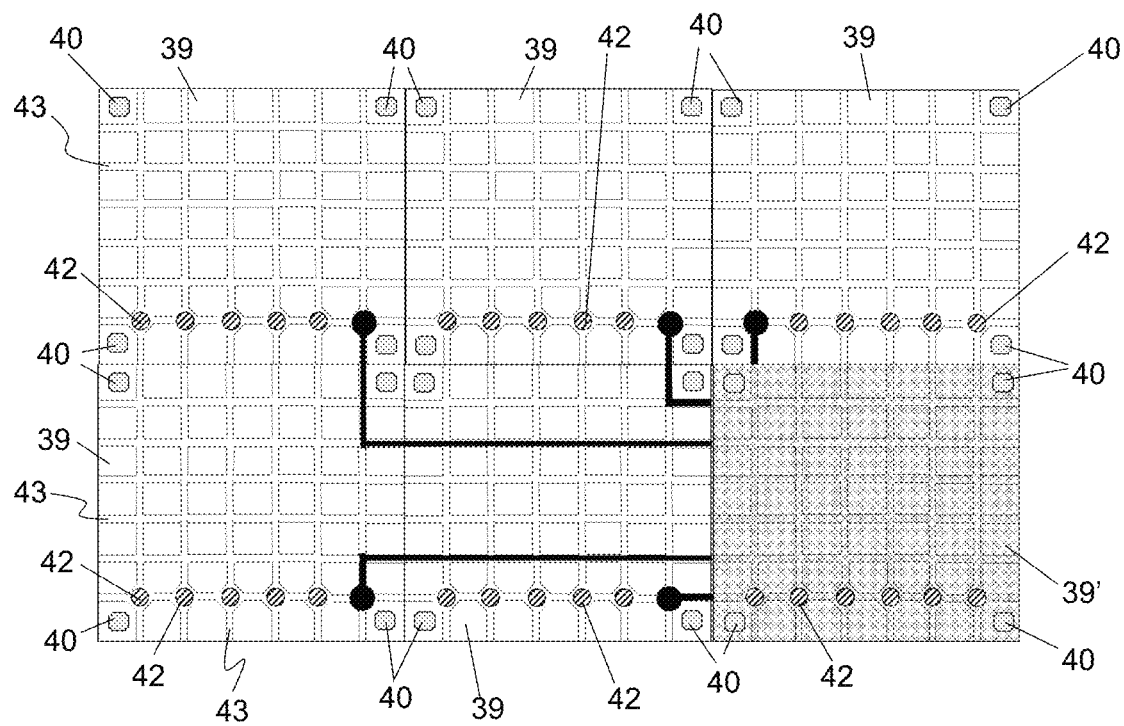
FIG. 8 illustrates an assembly of decking plates comprising one plate provided with power and signal electronics.

According to an embodiment, one decking plate comprises the control and power electronics for a group of attitude control modules according to the invention, and is provided with electrical connectors on at least two of its four sides for delivering and/or receiving power and other signals. FIG. 8 illustrates how one control and power plate 39' is connected to five standard plates 39 in an assembly of six plates in total. Cables between the side connectors on the control and power plate 39' are guided in the grooves 43 of the adjacent plates, towards one of the connectors 42 on the respective plates. According to a preferred embodiment, each connector 42 of a particular decking plate 39 comprises multiple pins and each connector 42 transmits the same set of signals from or to the module onto which the plate is fitted, so that a single connector from the control and power plate 39' is sufficient to transmit all required signals to one of the five modules, and so that this connector may be coupled to any of the connectors 42 on the module. Preferably, the control and power plate 39' is itself also provided with connectors 42 for connecting a module onto which the plate itself 39' is mounted, and mechanical slots 40 for mounting the plate 39' onto such a module. The control and power electronics in the control and power plate 39' comprises a computer that is configured to control all the modules that are connected to the control and power plate 39'. In other words, the computer is loaded with a software for controlling the modules. The assembly of multiple modules according to the invention, provided with decking plates as described above, one of which is a control and power decking plate 39' connected to all the modules of the assembly is therefore a self-contained attitude and control system. The availability of such a self-contained system increases the design flexibility of the satellite as a whole. Whereas in the past every change in the attitude control system of a satellite would have required a full update of the satellite's control software, the implementation of a self-contained system makes it easier to update only this system or replace it by another self-contained system (for example. with more or less modules). The attitude control system can thereby be implemented as a plug-in sub-system of a satellite.

Figure 9:
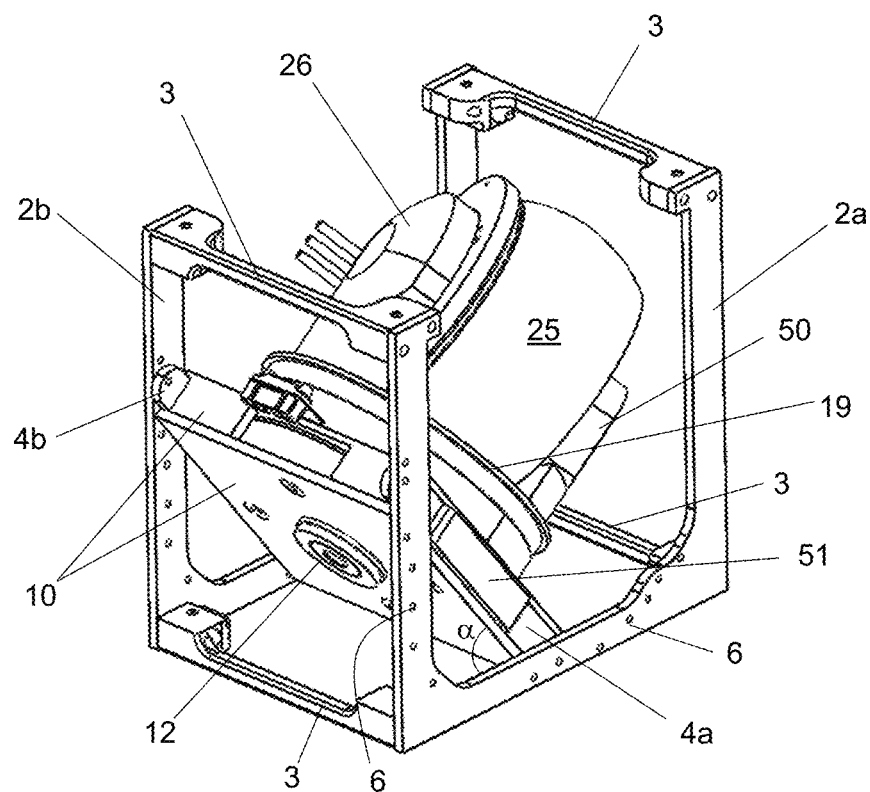
FIG. 9 illustrates another embodiment of a SGCMG module according to the invention.

An alternative embodiment of a SGCMG module according to the invention is illustrated in FIG. 9. A number of components are the same as the ones described in relation to the embodiments of FIGS. 1 and 2, and these components are indicated by the same reference numerals. It is to be noted that in the module shown in FIG. 9, the brackets 3 are shorter than the horizontal portions of the U-shaped elements 2a and 2b, so that the module is more narrow and thereby more compact than the cube-shaped module of FIGS. 1 and 2. The profiles 4a,4b to which the platform 10 is attached are not L-shaped profiles in this case, but lathe-shaped profiles, which can once again be positioned at various inclination angles $\alpha$, through screw connections via holes 6. In the embodiment shown, the profiles 4a,4b comprise an expulsion 51 in the centre, which maximizes the space in between the two facing profiles. The platform 10 is fixed to these profiles, and can be re-positioned relative to the profiles, in accordance with the angle $\alpha$. The electric motor 12 for driving the rotation of the gimbal structure about the gimbal axis is now not a piezo-motor but a direct drive brushless motor. The gimbal structure comprises a second bracket 50 on the opposite side of the first bracket 26, the second bracket supporting the flywheel 25 on said opposite side.

While the invention has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A spacecraft attitude control module comprising:
a 3-dimensional rectangular support frame defined by level rib portions arranged in a ground plane and in an upper plane, and upstanding rib portions interconnecting the level rib portions of the ground plane to the level rib portions of the upper plane,
an attitude control assembly fitted within the confines of the 3-dimensional rectangular support frame, and comprising:
a reference structure comprising a platform that is fixed to the 3-dimensional rectangular support frame,
a flywheel and a flywheel support structure mounted to the platform, wherein the flywheel support structure is oriented along a first axis that is perpendicular with respect to the platform, and
a flywheel motor for actuating rotation of the flywheel relative to the flywheel support structure about a second axis that is essentially perpendicular to the first axis,
wherein the flywheel comprises a hollow central portion, and wherein the flywheel motor is mounted inside the hollow central portion, and
wherein the platform is a rectangular platform attached to a pair of mutually parallel profiles, ends of each profile of the pair of mutually parallel profiles being directly fixed respectively to a level rib portion of the level rib portions arranged in the ground plane and to an upstanding rib portion of the upstanding rib portions of the 3-dimensional rectangular support frame, so that the pair of mutually parallel profiles and the rectangular platform are in a slanted position relative to the ground plane of the 3-dimensional rectangular support frame.

2. The spacecraft attitude control module according to claim 1, wherein the slanted position of the platform relative to the ground plane of the 3-dimensional rectangular support frame is adjustable to one of a plurality of fixed angular positions.

3. The spacecraft attitude control module according to claim 1 wherein the flywheel support structure comprises at least a first upstanding bracket, and wherein the flywheel motor is attached to said bracket through a carrier frame comprising a planar portion that is fixed to a lateral surface of the first upstanding bracket, and a tubular portion extending outward from the planar portion, wherein the flywheel motor is mounted inside the tubular portion and is attached to a distal end thereof, and wherein the tubular portion is inserted in the hollow central portion of the flywheel, the flywheel motor having a rotatable axle protruding through the distal end of the tubular portion and being coupled to the flywheel.

4. The spacecraft attitude control module according to claim 1, wherein the flywheel support structure is immovably fixed to the platform, so that the spacecraft attitude control module operates as a reaction wheel.

5. The spacecraft attitude control module according to claim 1, wherein the flywheel support structure is a gimbal structure that is rotatable with respect to the platform about the first axis, so that the spacecraft attitude control module operates as a single gimbal control moment gyroscope (SGCMG), and wherein the reference structure comprises a gimbal motor configured to actuate the rotation of the gimbal structure relative to the platform.

6. The spacecraft attitude control module according to claim 5, wherein the platform comprises a cavity in the back of the platform, and wherein the gimbal motor is fitted partially into the cavity, the gimbal motor comprising a rotatable axle protruding through the platform at the front thereof, and wherein the gimbal structure is coupled to the rotatable axle.

7. The spacecraft attitude control module according to claim 5, wherein the gimbal structure comprises:
a first gimbal portion rotatably coupled to the gimbal motor,
an encoder disc,
a planar second gimbal portion attached to the first gimbal portion with the encoder disc interposed between the first gimbal portion and the planar second gimbal portion,
at least a first upstanding bracket, with the flywheel motor being attached to said upstanding bracket, and
wherein the reference structure comprises a sensor configured to detect a position of the encoder disc.

8. The spacecraft attitude control module according to claim 7, further comprising a second upstanding bracket on an opposite side of the first upstanding bracket, so that the flywheel is supported on two sides by the first upstanding bracket and second upstanding bracket.

9. An attitude control system comprising multiple spacecraft attitude control modules according to claim 1, arranged on a support plate and mechanically attached to said support plate and to each other, and wherein the spacecraft attitude control modules are preferably arranged in a rectangular array.

10. The attitude control system according to claim 9, wherein each spacecraft attitude control module is provided with a decking plate mechanically attached to the upper plane of the spacecraft attitude control module, and wherein adjacent decking plates are mechanically attached to each other.

11. The attitude control system according to claim 10, wherein the decking plates are provided with first electrical connectors and wherein the spacecraft attitude control modules are provided with second electrical connectors configured to engage with the first electrical connectors for establishing an electrical connection, and wherein the first electrical connectors on the decking plates and the second electrical connectors of the spacecraft attitude control modules are positioned in such a manner that the electrical connection is established when the decking plates are mechanically attached to the upper plane of the spacecraft attitude control modules.

12. The attitude control system according to claim 11, wherein at least one decking plate of the attitude control system comprises control and power electronics for powering and controlling a plurality of modules of the attitude control system, and wherein the at least one decking plate comprising the control and power electronics is electrically connected to the plurality of decking plates provided on the plurality of modules.

* * * * *